(12) United States Patent
Kobune et al.

(10) Patent No.: US 9,211,667 B2
(45) Date of Patent: Dec. 15, 2015

(54) METHOD AND DEVICE FOR MOLDING SOFT AND THIN RESIN MOLDED PRODUCT

(71) Applicants: CALSONIC KANSEI CORPORATION, Saitama-shi, Saitama (JP); NISSAN MOTOR CO., LTD., Yokohama-shi, Kanagawa (JP)

(72) Inventors: Yoshihito Kobune, Saitama (JP); Kenjiro Sugimoto, Saitama (JP); Kaoru Ishii, Yokohama (JP)

(73) Assignees: CALSONIC KANSEI CORPORATION, Saitama-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/420,084

(22) PCT Filed: Jul. 23, 2013

(86) PCT No.: PCT/JP2013/069951
§ 371 (c)(1),
(2) Date: Feb. 6, 2015

(87) PCT Pub. No.: WO2014/024680
PCT Pub. Date: Feb. 13, 2014

(65) Prior Publication Data

US 2015/0165664 A1    Jun. 18, 2015

(30) Foreign Application Priority Data

Aug. 9, 2012   (JP) ................................ 2012-176959

(51) Int. Cl.
*B29C 45/42* (2006.01)
*B29C 45/40* (2006.01)
*B29C 45/14* (2006.01)

(52) U.S. Cl.
CPC ............. *B29C 45/40* (2013.01); *B29C 45/4005* (2013.01); *B29C 45/42* (2013.01); *B29C 45/4225* (2013.01); *B29C 45/14811* (2013.01); *B29C 2045/4063* (2013.01)

(58) Field of Classification Search
CPC .................. B29C 37/0007; B29C 2045/4063; B29C 2045/4068; B29C 45/42; B29C 45/4225
See application file for complete search history.

(56) References Cited

U.S. PATENT DOCUMENTS

| | | | |
|---|---|---|---|
| 6,464,483 B1* | 10/2002 | Lichtinger | 425/116 |
| 6,485,285 B1* | 11/2002 | Shiotani | 425/139 |
| 7,276,200 B2* | 10/2007 | Jacob et al. | 264/334 |
| 2003/0132553 A1* | 7/2003 | Wilsterman et al. | 264/407 |

FOREIGN PATENT DOCUMENTS

| | | |
|---|---|---|
| EP | 2 324 983 A1 | 5/2011 |
| JP | 2-80424 | 6/1990 |

(Continued)

*Primary Examiner* — Jill Heitbrink
(74) *Attorney, Agent, or Firm* — Foley & Lardner LLP

(57) ABSTRACT

The present invention relates to a method and a device for molding a soft and thin resin molded product, in which molten resin is injected into a molding space between a concave mold and a convex mold to mold the soft and thin resin molded product. The convex mold or the concave mold is opened while the soft and thin resin molded product is left in the concave mold in such a way as to become open in its concave-shaped portion. Then, at least two chuck tabs formed outside the concave-shaped portion of the soft and thin resin molded product left in the concave mold are each held by a chuck of a molded product removing machine, and the concave-shaped portion of the soft and thin resin molded product is supported by a support arm of the molded product removing machine.

8 Claims, 7 Drawing Sheets

(56) References Cited

FOREIGN PATENT DOCUMENTS

| | | |
|---|---|---|
| JP | H10-156872 A | 6/1998 |
| JP | 11-048283 | 2/1999 |
| JP | 2003-181885 A | 7/2003 |
| JP | 2011-218631 A | 11/2011 |
| WO | WO-03/082544 A1 | 10/2003 |

* cited by examiner

METHOD AND DEVICE FOR MOLDING SOFT AND THIN RESIN MOLDED PRODUCT

TECHNICAL FIELD

The present invention relates to a method and a device for molding a soft and thin resin molded product, enabling the achievement of hitherto difficult automation of demolding of the soft and thin resin molded product.

BACKGROUND ART

A vehicle such as an automobile is provided with a vehicle-cabin front interior panel called an instrument panel or a dashboard or the like, in a vehicle cabin at its front portion.

Some of such vehicle-cabin front interior panels have a multilayer structure formed of a cushion layer and a soft and thin skin material laminated on a surface of a hard core material.

The soft and thin skin material is typically manufactured by powder slush molding, vacuum molding, or the like.

Among these moldings, the powder slush molding, in short, involves melting and adhering resin powder to a heated mold thereby to perform molding, and the vacuum molding, in short, involves bringing a thermally softened thermoplastic resin sheet into intimate contact with a vacuum mold by vacuum suction thereby to form the thermoplastic resin sheet into the shape of the vehicle-cabin front interior panel.

Since such powder slush molding or vacuum molding uses particular facilities, development of a technology for enabling injection molding using general facilities to mold the soft and thin skin material has advanced. (Refer to Patent Literature 1, for example.)

CITATION LIST

Patent Literature

Patent Literature 1: Japanese Patent Application Publication No. 2011-218631

SUMMARY OF INVENTION

Problem to Solution

However, means for manufacturing a soft and thin resin molded product described in Patent Literature 1 has a difficulty in mechanical and automatic demolding and hence requires manual operation for demolding, since the soft and thin resin molded product obtained by molding is very delicate, or equivalently, the soft and thin resin molded product at the time of demolding is extremely soft because of being higher in its temperature than that at normal temperature.

Solution to Problem

In order to solve the foregoing problem, there is provided a method for molding a soft and thin resin molded product, in which molten resin is injected into a molding space formed between a concave mold and a convex mold to mold the soft and thin resin molded product, the method including: opening at least one of the concave mold and the convex mold while the soft and thin resin molded product is left in the concave mold; locking at least two locking tabs formed outside a concave-shaped portion of the soft and thin resin molded product left in the concave mold, by an arm of a molded product removing machine; supporting the concave-shaped portion of the soft and thin resin molded product by a support arm of the molded product removing machine; and demolding the soft and thin resin molded product from the concave mold by separating the molded product removing machine from the concave mold while maintaining the locking and the supporting.

Advantageous Effects of Invention

According to the above-described configuration, an operational advantage as given below can be achieved. Specifically, demolding can be performed under a condition where at least three points, specifically, at least two positions outside the concave-shaped portion of the soft and thin resin molded product, and the concave-shaped portion thereof, are locked by the arm of the molded product removing machine and supported by the support arm thereof. Thus, the soft and thin resin molded product can be successfully demolded without being creased or otherwise poorly shaped. This enables the hitherto difficult mechanization and automation of demolding of the soft and thin resin molded product.

DESCRIPTION OF EMBODIMENTS

Specific examples of embodiments will be described in detail below with reference to the drawings.

FIGS. 1 to 15 are of assistance in explaining examples and modifications thereof.

Figure 1:
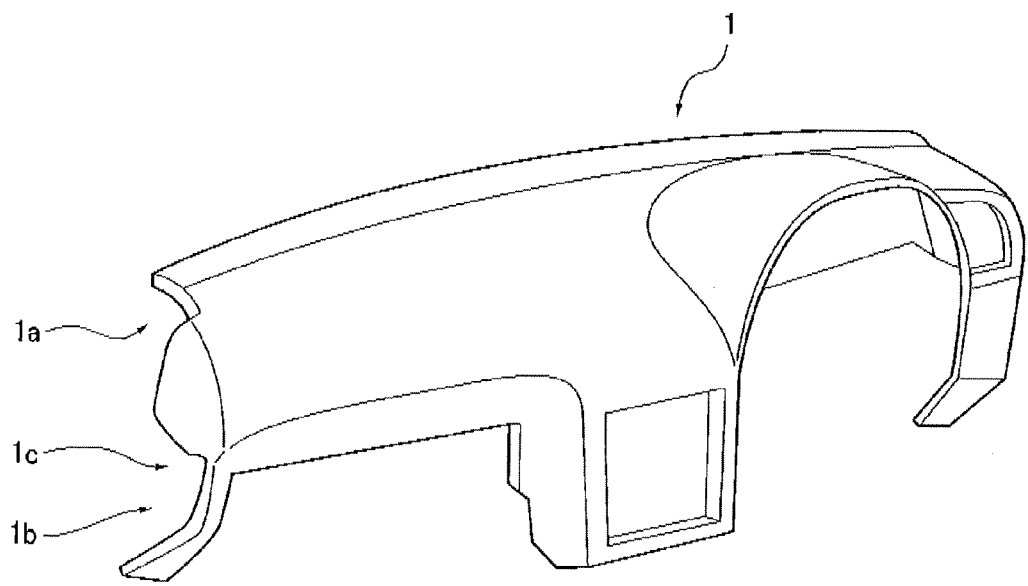
FIG. 1 is a perspective view of an instrument panel.

A vehicle such as an automobile is provided with a vehicle-cabin front interior panel called an instrument panel 1 as illustrated in FIG. 1 or a dashboard or the like (hereinafter called the instrument panel 1), in a vehicle cabin at its front portion.

Figure 2:
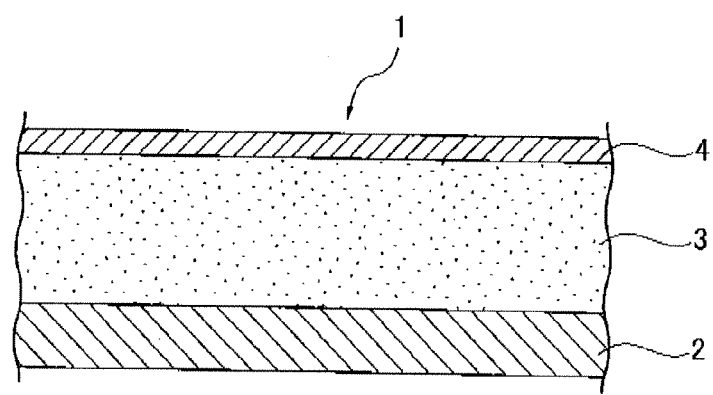
FIG. 2 is a partial sectional view of the instrument panel of FIG. 1.

Some of such instrument panels 1 have a multilayer structure formed of a cushion layer 3 (or a foamed layer) and a soft and thin (or equivalently, extremely soft and extremely thin) skin material 4 laminated on a surface of a hard core material 2, as illustrated in FIG. 2.

The present invention relates to a method and a device for molding a soft and thin resin molded product, which can be used for molding the soft and thin skin material 4 as described above, for example.

EXAMPLES

Configurations

Configurations will be described below.

Firstly, a "soft and thin resin molding device" will be described.

[Configuration 1]

Figure 3:
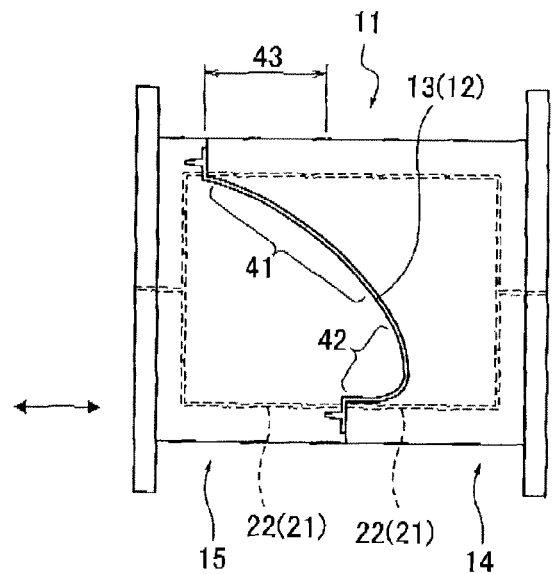
FIG. 3 is a side view illustrating a closed state of a concave mold and a convex mold in a soft and thin resin molding device according to an embodiment.

As illustrated in FIG. 3, a soft and thin resin molding device 11 includes a concave mold 14 and a convex mold 15 having a molding space 13 for molding (or injection molding) a soft and thin resin molded product 12.

Figure 4:
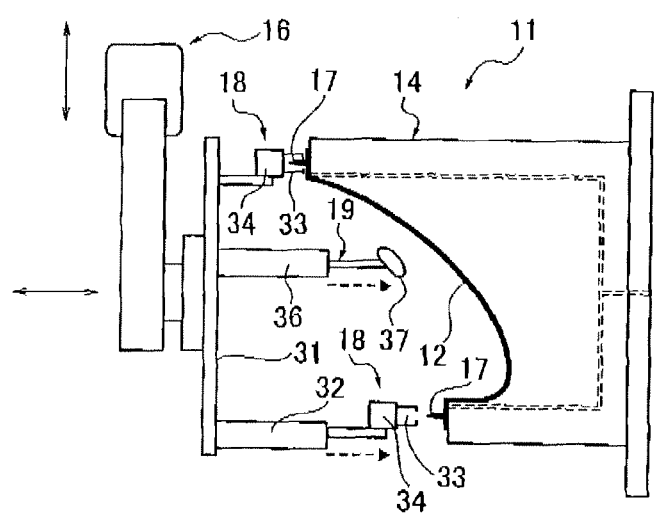
FIG. 4 is a side view illustrating a molded product removing machine in the soft and thin resin molding device of FIG. 3.
Figure 5:
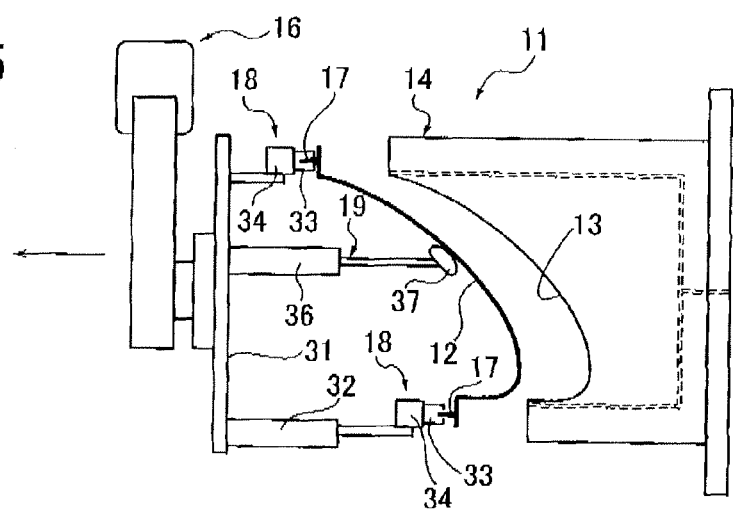
FIG. 5 is a view of assistance in explaining operation of FIG. 4.

As illustrated in FIGS. 4 and 5, the soft and thin resin molding device 11 also includes a molded product removing machine 16 for demolding the soft and thin resin molded product 12 formed in the molding space 13, from the concave mold 14.

Also, the molded product removing machine 16 includes an arm (for example, a chuck 18 for holding chuck tabs 17) for locking at least two locking tabs (for example, plural chuck tabs 17) formed outside (for example, in upper and lower edge portions of) a concave-shaped portion of the soft and thin resin molded product 12 (for example, a product underside) left in the concave mold 14 so as to become open by opening at least one of the convex mold 15 and the concave mold 14, and a support arm 19 for supporting the concave-shaped portion of the soft and thin resin molded product 12 (for example, a vertically intermediate portion on the product underside).

Also, the molded product removing machine 16 is configured to be separable from the concave mold 14 (or move away from therefrom).

[Supplementary Explanation 1]

Here, the "soft and thin resin molded product 12" has a complicated shape and a large size (or a large area), for example having a width of about 1.4 to 2 m, a height of about 60 to 90 cm and a depth of about 40 to 90 cm in a vehicle longitudinal direction, in a case of, for example, the skin material 4 of the instrument panel 1 of FIGS. 1 and 2. Meanwhile, a thickness of the skin material 4 of the instrument panel 1 is as extremely small as about 1.0 to 2.0 mm and the skin material 4 is soft. Also, the instrument panel 1 (or the skin material 4 thereof), as seen in a side view, has substantially a curved shape having a top surface portion 1a facing at least upward, a rear surface portion 1b facing toward an occupant, and a bent portion 1c interposed between the top surface portion 1a and the rear surface portion 1b. Also, a convex surface side (or a convex-shaped portion) of the curved shape forms a product top surface, and a concave surface side (or a concave-shaped portion) of the curved shape forms the product underside.

The "molding space 13" is formed between the concave mold 14 and the convex mold 15, as illustrated in FIG. 3. As described above, the molding space 13 for molding the soft and thin resin molded product 12 is formed of an extremely narrow gap (of about 1.0 to 2.0 mm). Therefore, molten resin having very high fluidity is injected into the extremely narrow molding space 13 so that the molten resin can spread in every corner.

Figure 6A:
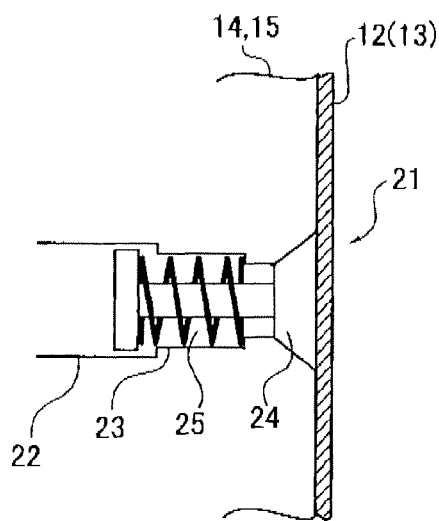
FIG. 6A is an enlarged partial sectional view illustrating an air ejector provided in each of the concave mold and the convex mold of FIG. 3, illustrating a state before the operation.
Figure 6B:
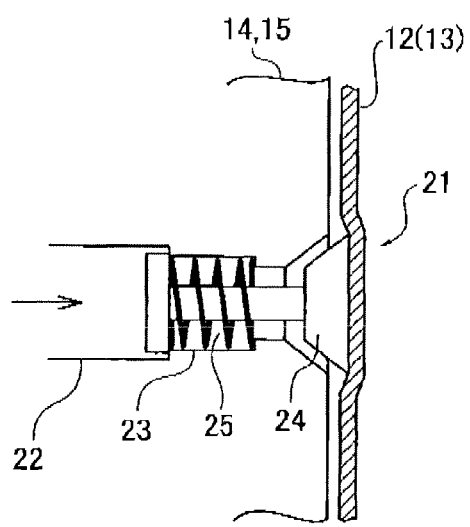
FIG. 6B is an enlarged partial sectional view illustrating the air ejector provided in each of the concave mold and the convex mold of FIG. 3, illustrating a state after the operation.

The "concave mold 14" forms the product top surface of the soft and thin resin molded product 12. The concave mold 14 is configured as a concave fixed mold, for example. However, the concave mold 14 may be configured as a concave movable mold. A decorative pattern, such as a grain pattern, for decoration of the product top surface is formed in the molding space 13 on the concave mold 14 side, as needed. Also, the concave mold 14 is provided with an air ejector 21 as illustrated in FIGS. 6A and 6B.

The air ejector 21 causes the soft and thin resin molded product 12 to float over the concave mold 14 by an air pressure. The air ejector 21 includes an air passage 22 provided within the concave mold 14 so as to provide communication between the inside and outside of the molding space 13, a movable valve element 24 housed and installed in a valve housing space 23 provided in an opening portion of the air passage 22 on the molding space 13 side thereof, in such a manner that the movable valve element 24 can enter and exit the valve housing space 23, and a return spring 25 (a return elastic member, a pulling spring) which biases the movable valve element 24 in a direction in which the movable valve element 24 is housed within the valve housing space 23.

The movable valve element 24 includes a cylindrical shaft portion provided integrally with a fan-shaped conical valve portion. Correspondingly, the valve housing space 23 also includes a cylindrical space having a larger diameter than that of the shaft portion, and a conical space having the same size and shape as those of the valve portion.

The plural air ejectors 21 are provided at a position outward of a portion of the soft and thin resin molded product 12 to form the product, at a position to form an opening or the like of the soft and thin resin molded product 12, or equivalently, at a position to be cut off from the product by a process to be performed later, and at other positions.

The "convex mold 15" forms the product underside of the soft and thin resin molded product 12. The convex mold 15 is configured as a convex movable mold, for example. However, the convex mold 15 may be configured as a convex fixed mold. The convex mold 15 is provided with the air ejector 21 as illustrated in FIGS. 6A and 6B in the same manner as above described. Since the air ejector 21 of the convex mold 15 is the same as the air ejector 21 of the concave mold 14, description thereof will be omitted by replacing the concave mold 14 in the above description by the convex mold 15.

The "molded product removing machine 16" is insertable between the opened concave and convex molds 14, 15, as illustrated in FIGS. 4 and 5. Alternatively, the molded product removing machine 16 is configured to be capable of facing the opened molding space 13 of the concave mold 14 after the opening of the convex mold 15. In this case, an industrial robot, for example, is mainly used as the molded product removing machine 16. Preferably, the industrial robot is of a three-axes type which is movable at least in directions of three axes orthogonal to one another, or is of a three- or more-axes type. A direction of separation (or separable movement) of the molded product removing machine 16 from the concave mold 14 is the same as a direction of demolding of the soft and thin resin molded product 12, or a mold-withdrawing direction of the convex mold 15, or the like. Of course, the molded product removing machine 16 can move into close proximity to the concave mold 14.

Figure 7A:
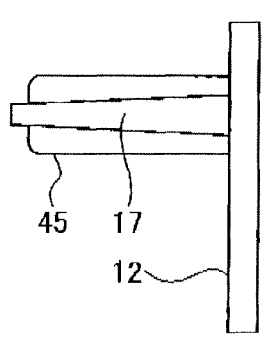
FIG. 7A is a side view illustrating a chuck tab of FIG. 4.
Figure 7B:
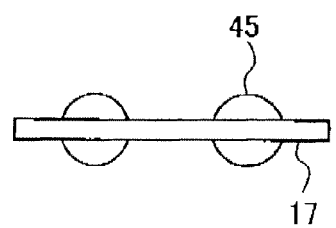
FIG. 7B is a front view illustrating the chuck tab of FIG. 4.
Figure 7C:
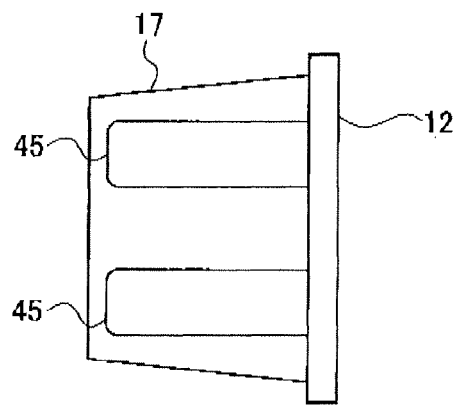
FIG. 7C is a plan view illustrating the chuck tab of FIG. 4.

The "locking tab" or the "chuck tab 17" is integrally molded with the soft and thin resin molded product 12 in a portion of the soft and thin resin molded product 12 outward of the portion thereof to form the product, as illustrated in FIGS. 7A, 7B and 7C. The chuck tab 17 is basically formed in substantially the same wall thickness as that of the soft and thin resin molded product 12 (or equivalently, is extremely thin-walled). However, the chuck tab 17 may also have a tapered shape so as to facilitate withdrawing the mold. In this case, the chuck tabs 17 are provided at plural locations at least on an outer side of the soft and thin resin molded product 12, for example, in the upper and lower edge portions thereof. The chuck tab 17 is for example in the form of a tongue having a width on the order of 3 to 5 cm, a length on the order of 2 to 4 cm, and a thickness on the order of about 1.0 to 2.0 mm, or in the like form. However, the size of the chuck tab 17 is not so limited. In the above figures, the chuck tab 17 has a substantially trapezoidal shape with an upper base on its leading end side and a lower base on the soft and thin resin molded product 12 side so as to be resistant to tearing. The chuck tab 17 is cut off and removed from the soft and thin resin molded product 12 at an appropriate time after demolding.

Figure 8:
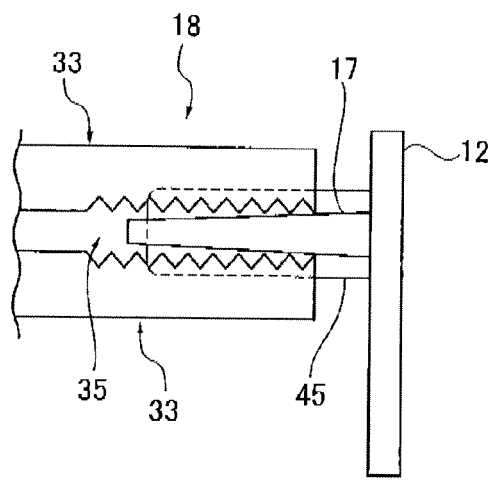
FIG. 8 is an enlarged view of a chuck piece portion of FIG. 4.

The "arm of the molded product removing machine 16" or the "chuck 18" is installed directly, or indirectly through a movable cylinder 32, on a base plate 31 mounted to the industrial robot which forms the molded product removing machine 16, as illustrated in FIGS. 4, 5 and 8. The movable cylinder 32 can move into close proximity to the chuck tab 17 and move away therefrom. In this case, the molding space 13 has a shape as later described, and thus, the chuck 18 on the upper edge portion side is installed directly on the base plate 31, and the chuck 18 on the lower edge portion side is installed indirectly through the movable cylinder 32 on the base plate 31. However, the movable cylinders 32 may also be provided on both the upper and lower chucks 18. Also, the provision of the movable cylinder 32 is not necessary, depending on circumstances.

The chuck 18 includes a pair of chuck pieces 33 (see FIG. 8) capable of sandwiching the chuck tab 17 therebetween, and a chuck cylinder 34 (see FIG. 4, although not specifically illustrated) capable of opening and closing the pair of chuck pieces 33. Biting portions 35 having a concave-convex shape are formed on facing surfaces (or sandwiching surfaces) of the pair of chuck pieces 33. The chucks 18 are provided in number corresponding to the number of the chuck tabs 17. Alternatively, the chuck 18 may be configured to be capable of simultaneously sandwiching and holding the plural chuck tabs 17, thereby to reduce the number of the chucks 18 installed.

As illustrated in FIGS. 4 and 5, the "support arm 19" includes a movable cylinder 36 installed on the base plate 31, and a support member 37 mounted to a leading end portion of the movable cylinder 36. The movable cylinder 36 holds the support member 37 so as to be capable of moving into close proximity to the soft and thin resin molded product 12 and separably moving away therefrom. The support member 37 may be configured for example in the form of a bar extending perpendicularly to the sheet as seen in the drawing. The support member 37 may have an inclined surface provided at its leading end side and capable of supporting the soft and thin resin molded product 12 on its lower side (just like lifting up it). In this case, the inclined surface of the support member 37 on the leading end side thereof has an upward slope to the left in the drawing, substantially along an inclined shape of the soft and thin resin molded product 12 on the product underside thereof. The support member 37 is wholly rounded in order to prevent it from causing damage such as a flaw to the soft and thin resin molded product 12, and is considered so as not to come in point or line contact with the soft and thin resin molded product 12 or do the like. The plural support arms 19 may be installed vertically, perpendicularly to the sheet as seen in the drawing, or in other directions.

In a case of the single support arm 19, preferably, the position of the vertically intermediate portion of the soft and thin resin molded product 12 supported by the support arm 19 is set to establish at least one of a position around a vertically intermediate position, a position around a center position in the mold-withdrawing direction (horizontally in FIG. 4), and a position around the position of center of gravity of the soft and thin resin molded product 12. However, all these positions do not coincide with one another and the positions also vary depending on a specific shape of the soft and thin resin molded product 12, and thus, a specific (or an optimum) support position is set by utilizing trials and errors or the like. In a case of the provision of the plural support arms 19, the optimum support position may be chosen as appropriate according to circumstances.

In the above-described embodiment, the convex mold 15 (or the convex movable mold) and the concave mold 14 (or the concave fixed mold) are configured to leave the soft and thin resin molded product 12 in the concave mold 14 (or the concave fixed mold); however, in another embodiment, the convex mold 15 (or the convex fixed mold) and the concave mold 14 (or the concave movable mold) may be configured to leave the soft and thin resin molded product 12 in the concave mold 14 (or the concave movable mold).

[Configuration 2]

As illustrated in FIG. 3, the molding space 13 is configured to have a curved shape having a smaller radius of curvature at its lower side than that at its upper side.

[Supplementary Explanation 2]

For example, the "molding space 13" includes a curvedly shaped portion 41 having a relatively large radius of curvature at its upper side, and a curvedly shaped portion 42 having a relatively small radius of curvature at its lower side.

[Configuration 3]

The molding space 13 is configured to protrude outward in the mold-withdrawing direction by a larger amount of protrusion in the upper edge portion than that in the lower edge portion (the amount of outward protrusion 43).

[Supplementary Explanation 3]

For example, the "molding space 13" protrudes toward the convex mold 15 by a considerably larger amount of protrusion in the upper edge portion than that in the lower edge portion. As illustrated in FIG. 5, the position of the lower edge portion of the molding space 13 substantially coincides vertically with the position of the vertically intermediate portion of the soft and thin resin molded product 12 supported by the support arm 19.

[Configuration 4]

As illustrated in FIGS. 7A, 7B and 7C, the chuck tab 17 is provided with a come-off preventive shape portion 45 for preventing the chuck tab 17 from coming off from the chuck 18.

[Configuration 5]

The "come-off preventive shape portion 45" may be configured as a partial thick-walled portion or the like provided on the chuck tab 17. In this case, the come-off preventive shape portion 45 is configured as a cylindrical thick-walled portion provided on the chuck tab 17. The cylindrical thick-walled portion extends in the mold-withdrawing direction.

The two cylindrical thick-walled portions are disposed substantially parallel to each other. However, the shape and installed position of the come-off preventive shape portion 45, the number of the come-off preventive shape portions 45 installed, the installed direction of the come-off preventive shape portion 45, and the like are not so limited. For example, the number of the thick-walled portions installed may be set to one or three or more. Also, the installed direction of the thick-walled portion may extend in a direction orthogonal to the mold-withdrawing direction. The thick-walled portion may have a spot-like shape or the like shape.

Next, description will be given with regard to a "method for molding the soft and thin resin molded product 12" using the soft and thin resin molding device 11.

[Configuration 6]

In the method for molding the soft and thin resin molded product 12, first, molten resin is injected into the molding space 13 formed between the concave mold 14 and the convex mold 15 to mold (or injection mold) the soft and thin resin molded product 12 (a molding process).

Then, at least one of the concave mold 14 and the convex mold 15 is opened while the soft and thin resin molded product 12 is left in the concave mold 14. For example, the convex mold 15 is opened while the soft and thin resin molded product 12 is left in the concave mold 14 in such a way as to become open at the product underside thereof (a mold opening process).

Further, as illustrated in FIG. 4, the at least two locking tabs formed outside the concave-shaped portion of the soft and thin resin molded product 12 left in the concave mold 14 are each locked by the arm of the molded product removing machine 16, and the concave-shaped portion of the soft and thin resin molded product 12 is supported by the support arm 19 provided in the molded product removing machine 16. For example, the plural chuck tabs 17 formed in the upper and lower edge portions of the soft and thin resin molded product 12 left in the concave mold 14 are each held by the chuck 18 provided in the molded product removing machine 16, and the concave-shaped, vertically intermediate portion of the soft and thin resin molded product 12 on the product underside thereof is supported by the support arm 19 provided in the molded product removing machine 16 (a soft and thin resin molded product supporting process).

Finally, as illustrated in FIG. 5, the arm of the molded product removing machine 16 is separated from the concave mold 14 to demold the soft and thin resin molded product 12 from the concave mold 14. For example, the soft and thin resin molded product 12 is demolded from the concave mold 14 by separating (or separably moving) the molded product removing machine 16 from the concave mold 14 while maintaining the above-described condition (specifically, a condition where the chuck tabs 17 are each held by the chuck 18, and the vertically intermediate portion of the soft and thin resin molded product 12 is supported by the support arm 19) (a demolding process).

[Supplementary Explanation 6]

Although not particularly illustrated, a well-known means may be used to inject the molten resin into the molding space 13.

When opening the convex mold 15, the air ejector 21 as illustrated in FIGS. 6A and 6B is used to cause the soft and thin resin molded product 12 to at least partially float over the convex mold 15 by an air pressure.

Also, when the molded product removing machine 16 demolds the soft and thin resin molded product 12 from the concave mold 14, the air ejector 21 is used in advance to cause the soft and thin resin molded product 12 to at least partially float over the concave mold 14 by the air pressure. In this case, the air ejector 21 causes the movable valve element 24 to protrude by the air pressure thereby to extrude partially the soft and thin resin molded product 12, and also injects air between an extruded portion of the soft and thin resin molded product 12 and the convex mold 15 or the concave mold 14 thereby to cause the soft and thin resin molded product 12 to float over the convex mold 15 or the concave mold 14. Note that the air ejector 21 causes the soft and thin resin molded product 12 to float over the concave mold 14 after the opening of the convex mold 15 has been finished.

Advantageous Effects

According to the embodiment, operational advantages as given below can be achieved.

[Operational Advantage 1]

Demolding can be performed under, a condition where at least three points, specifically, at least two positions (for example, the upper and lower edge portions) outside the concave-shaped portion of the soft and thin resin molded product 12, and the concave-shaped portion (for example, the vertically intermediate portion) of the soft and thin resin molded product 12, are held by the arm (for example, the chuck 18) of the molded product removing machine 16 and supported by the support arm 19 thereof. Thus, the soft and thin resin molded product 12 can be successfully demolded without being creased or otherwise poorly shaped. This enables the hitherto difficult mechanization and automation of demolding of the soft and thin resin molded product 12.

In this case, at least one of the convex mold 15 and the concave mold 14 is opened while the soft and thin resin molded product 12 is left in the concave mold 14 in such a way as to become open in the concave-shaped portion thereof (for example, at the product underside thereof). Thereby, as illustrated in FIGS. 4 and 5, the concave-shaped soft and thin resin molded product 12 (or the vertically intermediate portion thereof on the product underside) can be supported by the support arm 19. Thus, during demolding, for example, the soft and thin resin molded product 12 can be prevented from hanging down under its own weight in the vertically intermediate portion thereof and thus being creased or otherwise poorly shaped.

Figure 9:
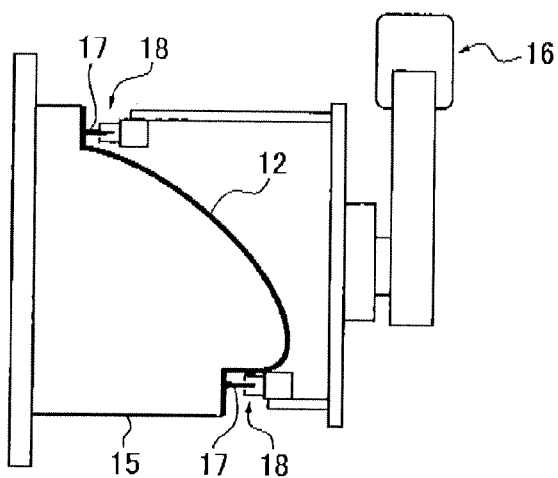
FIG. 9 is a view illustrating a state in which the concave mold is opened while a soft and thin resin molded product is left in the convex mold in such a way as to become open at its product top surface side.
Figure 10:
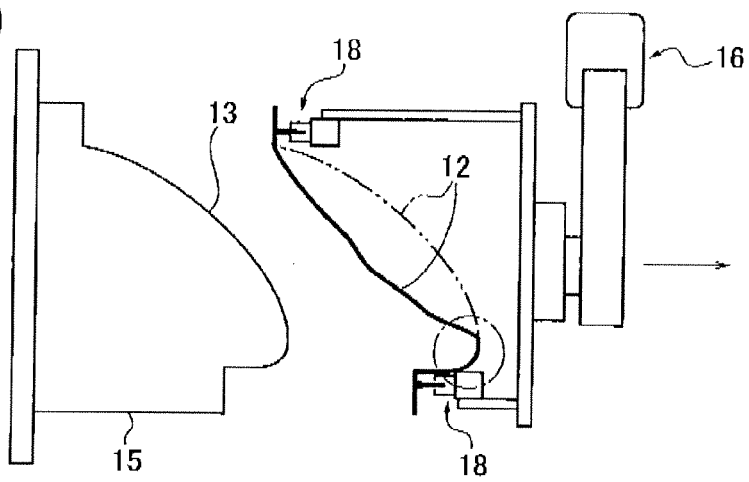
FIG. 10 is a view illustrating a demolded state of FIG. 9.

On the other hand, as illustrated in FIGS. 9 and 10, if the concave mold 14 is opened while the soft and thin resin molded product 12 is left in the convex mold 15 in such a way as to become open at the product top surface side thereof, the concave-shaped soft and thin resin molded product 12 (or the vertically intermediate portion thereof on the product top surface side) cannot be supported by the support arm 19 (just like lifting up it on the lower side). Thus, during demolding, the soft and thin resin molded product 12 cannot avoid hanging down under its own weight in the vertically intermediate portion thereof and thus being creased or otherwise poorly shaped (See a circled portion in FIG. 10, in particular.)

[Operational Advantage 2]

The molding space 13 is configured to have the curved shape having a smaller radius of curvature at its lower side than that at its upper side. Thereby, as illustrated in FIGS. 4 and 5, the soft and thin resin molded product 12 molded in the molding space 13 has a portion at its upper side, which has a large radius of curvature and is relatively prone to deformation, and has a portion at its lower side, which has a small radius of curvature and is relatively resistant to deformation, and thus, the upper, relatively deformation-prone portion of the soft and thin resin molded product 12 can be properly supported by the support arm 19. Therefore, the soft and thin resin molded product 12 can be successfully demolded from the concave mold 14.

On the other hand, contrary to the above, if the molding space 13 is configured to have a curved shape having a smaller radius of curvature at its upper side than that at its lower side, the molded soft and thin resin molded product 12, although not particularly illustrated, has a portion at its upper side, which has a small radius of curvature and is relatively resistant to deformation, and has a portion at its lower side, which has a large radius of curvature and is relatively prone to deformation, and thus, the support arm 19 supports the upper, relatively deformation-resistant portion of the soft and thin resin molded product 12 and cannot properly support the lower, relatively deformation-prone portion thereof. Therefore, it is difficult to successfully demold the soft and thin resin molded product 12 from the concave mold 14.

[Operational Advantage 3]

The molding space 13 is configured to protrude outward in the mold-withdrawing direction by a larger amount of protrusion in the upper edge portion than that in the lower edge portion. Thereby, as illustrated in FIGS. 4 and 5, the soft and thin resin molded product 12 molded in the molding space 13 has the upper portion located forward of a support point of the support arm 19, and thus, the support arm 19 can support the upper portion of the soft and thin resin molded product 12 with reliability. Therefore, the soft and thin resin molded product 12 can be successfully demolded from the concave mold 14.

Figure 11:
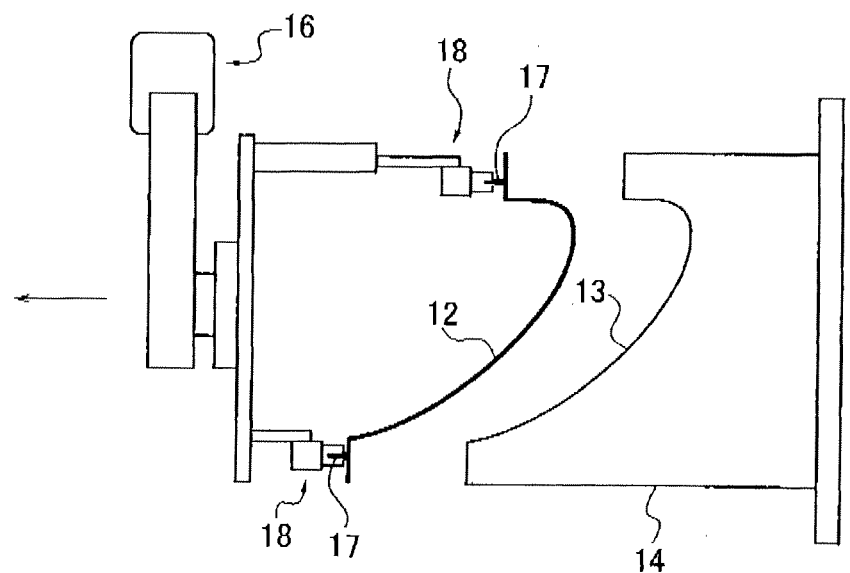
FIG. 11 is a view illustrating a state in which a molding space is configured to protrude outward in a mold-withdrawing direction by a larger amount of protrusion in a lower edge portion than that in an upper edge portion.
Figure 12:
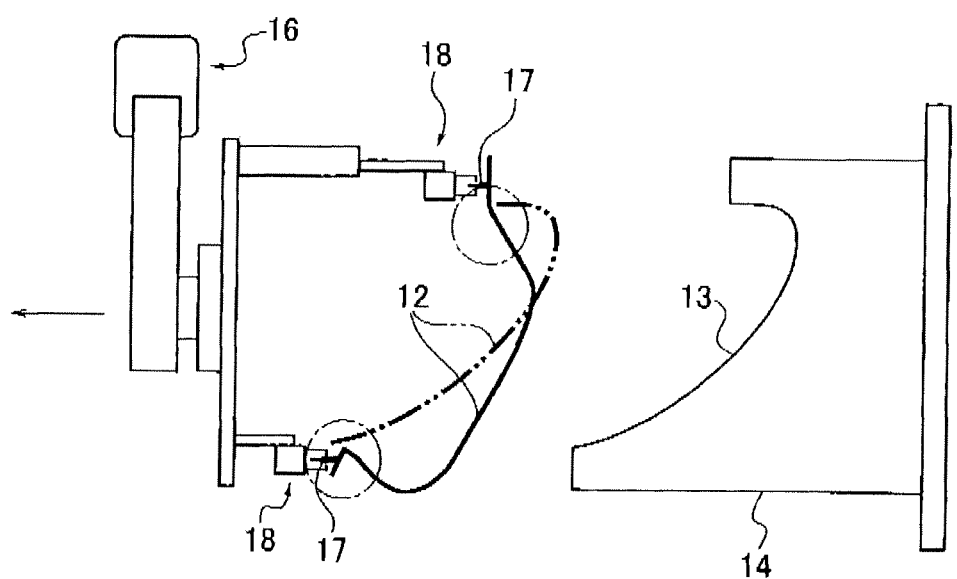
FIG. 12 is a view illustrating a demolded state of FIG. 11.

On the other hand, contrary to the above, as illustrated in FIGS. 11 and 12, if the molding space 13 is configured to protrude outward in the mold-withdrawing direction by a larger amount of protrusion in the lower edge portion than that in the upper edge portion, the molded soft and thin resin molded product 12 has the upper portion having a shape of back draft which is the reverse of that illustrated in FIG. 4 and renders it difficult for the support arm 19 to support the upper portion, and thus, it is difficult for the support arm 19 to successfully support the upper portion of the soft and thin resin molded product 12. Therefore, a situation (i.e. poor demolding) arises where it is difficult to successfully demold the soft and thin resin molded product 12 from the concave mold 14 and hence the soft and thin resin molded product 12 hangs down under its own weight and is thus creased or otherwise poorly shaped (See circled portions in FIG. 12, in particular)

[Operational Advantage 4]

As illustrated in FIGS. 7A, 7B and 7C, the chuck tab 17 is provided with the come-off preventive shape portion 45 for preventing the chuck tab 17 from coming off from the chuck 18. Thereby, as illustrated in FIG. 8, the chuck 18 can reliably hold the chuck tab 17 having substantially the same wall thickness as that of the soft and thin resin molded product 12 (or equivalently, which is thin-walled), and thus, the come-off preventive shape portion 45 can prevent the soft and thin resin molded product 12 from corning off from the chuck 18. This enables demolding under a condition where the chuck 18 holds the chuck tab 17 with reliability, and thus enables preventing the soft and thin resin molded product 12 from being creased or otherwise poorly shaped. Also, although a large peeling force acts on the chuck 18 when the soft and thin resin molded product 12 is demolded from the concave mold 14, the provision of the come-off preventive shape portion 45 enables the chuck 18 to accommodate the peeling force with reliability.

Figure 13A:
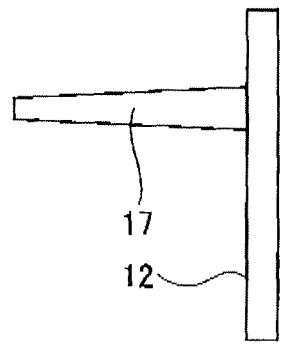
FIG. 13A is a side view illustrating the chuck tab which is not provided with a come-off preventive shape portion.
Figure 13B:
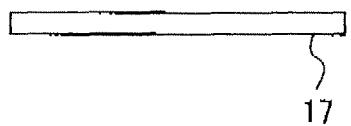
FIG. 13B is a front view illustrating the chuck tab which is not provided with the come-off preventive shape portion.
Figure 13C:
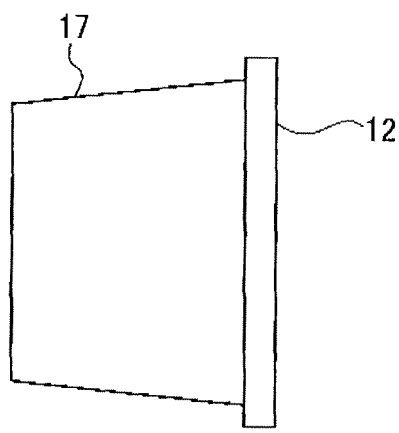
FIG. 13C is a plan view illustrating the chuck tab which is not provided with the come-off preventive shape portion.
Figure 14A:
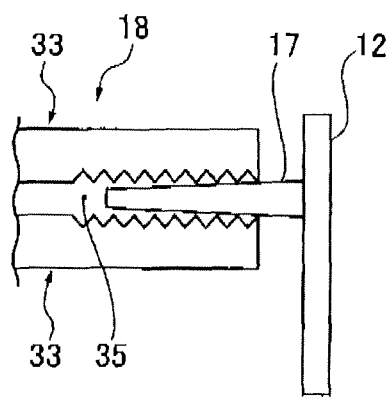
FIG. 14A is an enlarged view of the chuck piece portion of FIG. 4 holding the chuck tab of FIG. 13A.
Figure 14B:
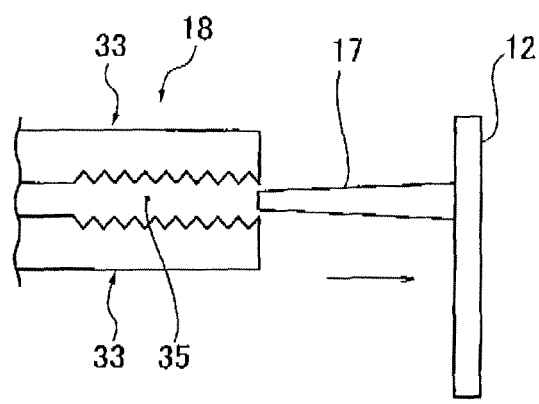
FIG. 14B is a view illustrating a state in which the chuck tab of FIG. 13A has come off from chuck pieces.
Figure 15:
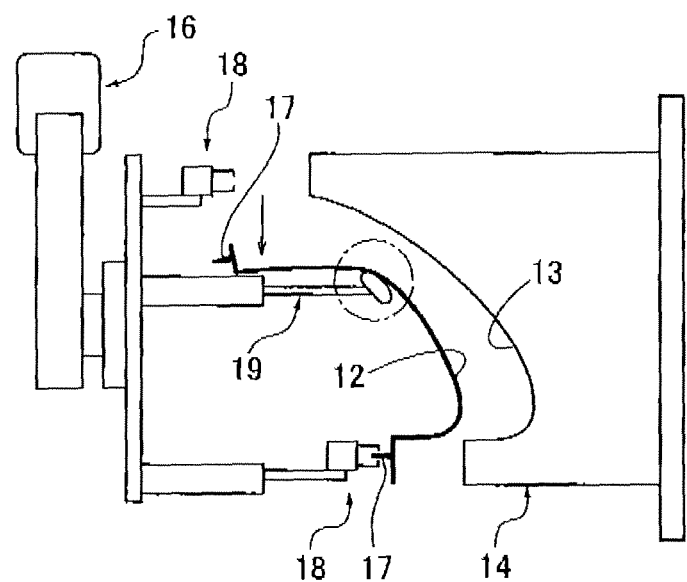
FIG. 15 is a view illustrating a demolded state in a case of the chuck tab which is not provided with the come-off preventive shape portion.

On the other hand, contrary to the above, if the chuck tab 17 having the same wall thickness as that of the soft and thin resin molded product 12 (or equivalently, which is thin-walled) is not provided with the come-off preventive shape portion 45 as illustrated in FIGS. 13A, 13B and 13C, the chuck tab 17 slips off and comes off from the chuck 18 when demolding is in process of being performed, as illustrated in FIGS. 14A and 14B. Then, as illustrated in FIG. 15, in a portion in which the chuck tab 17 has come off from the chuck 18, a situation (i.e. poor demolding) arises where the soft and thin resin molded product 12 hangs down under its own weight and is thus creased or otherwise poorly shaped. (See a circled portion in FIG. 15, in particular.)

Further, when the come-off preventive shape portion 45 is configured as the partial thick-walled portion as described above, this is an optimum configuration since it can increase rigidity of the chuck tab 17 to thus render the chuck tab 17 resistant to deformation and also make it easy for the chuck 18 to hold the chuck tab 17.

In addition, although not particularly illustrated, the provision of the come-off preventive shape portion 45 can reduce a time for cooling in the mold as compared to a case where the overall sheet thickness of the chuck tab 17 is simply increased, and thus can eliminate a situation where, when peeling is in process of being performed, the chuck tab 17 is torn off due to poor solidification caused by insufficient cooling of the chuck tab 17.

On the other hand, if the overall sheet thickness of the chuck tab 17 is simply increased, this leads to a long time for cooling the chuck tab 17 in the mold and also tends to bring about the situation where, when the peeling is in process of being performed, the chuck tab 17 is torn off due to the poor solidification caused by the insufficient cooling of the chuck tab 17.

[Operational Advantage 5]

The come-off preventive shape portion 45 is formed of the cylindrical thick-walled portion, and the cylindrical thick-walled portion extends in the mold-withdrawing direction. Thereby, during molding, the mold can be withdrawn without any trouble, and also, during demolding, the chuck 18 can hold the chuck tab 17 without any trouble.

Although the embodiments of the present invention have been described in detail above with reference to the drawings, it is to be understood that the embodiments are exemplary only of the present invention, and therefore the present invention is not limited only to the configurations of the embodiments, and design modifications and the like, even if made hereto without departing from the spirit and scope of the invention, of course, are included in the present invention. Of course, it will also be understood that, for example if each embodiment includes plural configurations, possible combinations of the configurations are included in the present invention even if not specified. Of course, it will also be understood that, if plural embodiments and modifications are given, possible ones of combinations of configurations throughout the embodiments and modifications are included in the present invention even if not specified. Of course, it will also be understood that the configurations depicted in the drawings are included in the present invention even if not specified. Further, the term "or (and) the like" is used to be construed as including the like thing. Moreover, the terms "substantially," "about" and "on the order of" and the like terms are used to be construed as including a thing having a permissible range or accuracy in view of common general knowledge.

INDUSTRIAL APPLICABILITY

The above-described embodiments of the present invention can be used in the skin material 4 of the instrument panel 1 in the vehicle such as the automobile; however, if a product having a large area and a complicated shape like the skin material 4 of the instrument panel 1 can be molded, the present invention can be widely applied to other products. For example, the present invention can be applied to molding of an interior panel other than the instrument panel 1 of the vehicle or the soft and thin resin molded product 12 for use in fields other than the vehicle.

REFERENCE SIGNS LIST

11 soft and thin resin molding device
12 soft and thin resin molded product
13 molding space
14 concave mold (concave fixed mold or concave movable mold)
15 convex mold (convex movable mold or convex fixed mold)
16 molded product removing machine
17 chuck tab (locking tab)
18 chuck (arm of molded product removing machine)
19 support arm
33 chuck piece
34 chuck cylinder
41 curvedly shaped portion
42 curvedly shaped portion
43 amount of outward protrusion
45 come-off preventive shape portion

CROSS-REFERENCE TO RELATED APPLICATION

This application is based upon and claims the benefit of priority of the prior Japanese Patent Application No. 2012-176959, filed on Aug. 9, 2012, the entire contents of which are incorporated herein by reference.

The invention claimed is:

1. A method for molding a soft and thin resin molded product, in which molten resin is injected into a molding space formed between a concave mold and a convex mold to mold the soft and thin resin molded product, the method comprising:
opening at least one of the concave mold and the convex mold while the soft and thin resin molded product is left in the concave mold;
locking at least two locking tabs formed outside a concave-shaped portion of the soft and thin resin molded product left in the concave mold, by an arm of a molded product removing machine;
supporting the concave-shaped portion of the soft and thin resin molded product by a support arm of the molded product removing machine; and
demolding the soft and thin resin molded product from the concave mold by separating the molded product removing machine from the concave mold while maintaining the locking and the supporting.

2. The method for molding a soft and thin resin molded product, according to claim 1, in which molten resin is injected into a molding space formed between a concave fixed mold and a convex movable mold to injection mold the soft and thin resin molded product, the method comprising:
opening the convex movable mold while the soft and thin resin molded product is left in the concave fixed mold in such a way as to become open at its product underside;
holding at least two chuck tabs formed in upper and lower edge portions of the soft and thin resin molded product left in the concave fixed mold, by a chuck provided in a molded product removing machine;
supporting a concave-shaped, vertically intermediate portion of the soft and thin resin molded product on the product underside thereof by a support arm provided in the molded product removing machine; and
demolding the soft and thin resin molded product from the concave fixed mold by separably moving the molded product removing machine away from the concave fixed mold while maintaining the holding and the supporting.

3. A soft and thin resin molding device comprising:
a concave mold and a convex mold having a molding space for molding a soft and thin resin molded product; and
a molded product removing machine configured to demold the soft and thin resin molded product formed in the molding space,
wherein the molded product removing machine comprises:
an arm configured to lock at least two locking tabs formed outside a concave-shaped portion of the soft and thin resin molded product left in the concave mold by opening at least one of the concave mold and the convex mold; and
a support arm configured to support the concave-shaped portion of the soft and thin resin molded product, and
wherein the arm is configured to be separable from the concave mold.

4. The soft and thin resin molding device according to claim 3 comprising:
a concave fixed mold and a convex movable mold having a molding space for injection molding a soft and thin resin molded product; and
a molded product removing machine configured to demold the soft and thin resin molded product formed in the molding space,
wherein the molded product removing machine comprises:
a chuck configured to hold at least two chuck tabs formed in upper and lower edge portions of the soft and thin resin molded product left in the concave fixed mold in such a way as to become open at its product underside by opening the convex movable mold; and
a support arm configured to support a vertically intermediate portion of the soft and thin resin molded product on the product underside thereof, and
wherein the molded product removing machine is configured to move away from the concave fixed mold.

5. The soft and thin resin molding device according to claim 3, wherein the molding space is configured to have a curved shape having a smaller radius of curvature at its lower side than that at its upper side.

6. The soft and thin resin molding device according to claim 3, wherein the molding space is configured to protrude outward in a mold-withdrawing direction by a larger amount of protrusion in the upper edge portion than that in the lower edge portion.

7. The soft and thin resin molding device according to claim 3, wherein the locking tab or the chuck tab is provided with a come-off preventive shape portion for preventing the locking tab or the chuck tab from coming off from the arm or the chuck.

8. The soft and thin resin molding device according to claim 7, wherein the come-off preventive shape portion is formed of a cylindrical thick-walled portion, and the cylindrical thick-walled portion extends in the mold-withdrawing direction.

\* \* \* \* \*